United States Patent [19]

Gassan et al.

[11] Patent Number: 5,357,006
[45] Date of Patent: Oct. 18, 1994

[54] PREPARATION OF RECYCLATE POLYOLS, AND THE USE THEREOF IN THE PREPARATION OF POLYURETHANES

[75] Inventors: Michael Gassan, Senftenberg; Bernhard Naber; Vera Neiss, both of Schwarzheide; Peter Moeckel, Luetzschena; Wolfgang Weissflog, Halle, all of Fed. Rep. of Germany

[73] Assignee: BASF Schwarzheide GmbH, Schwarzheide, Fed. Rep. of Germany

[21] Appl. No.: 132,854

[22] Filed: Oct. 7, 1993

[30] Foreign Application Priority Data

Oct. 12, 1992 [DE] Fed. Rep. of Germany .... 4234335.6

[51] Int. Cl.$^5$ .............................................. C08L 75/04
[52] U.S. Cl. .................................... 525/453; 525/460; 528/494; 252/182.24; 252/182.25; 252/182.26; 252/182.27
[58] Field of Search ................ 525/453, 460; 528/494; 252/182.24, 182.25, 182.27, 182.26

[56] References Cited

U.S. PATENT DOCUMENTS

| 3,109,824 | 11/1963 | Heiss | 260/2.3 |
|---|---|---|---|
| 3,404,103 | 10/1968 | Matsudaira et al. | 260/2.3 |
| 3,632,530 | 1/1972 | Kinoshita | 260/2.3 |
| 3,983,087 | 9/1976 | Tucker et al. | 260/2.3 |
| 4,014,809 | 3/1977 | Kondo et al. | 252/182 |
| 4,511,680 | 4/1985 | Niederdellmann et al. | 521/49.5 |

FOREIGN PATENT DOCUMENTS

| 2087718 | 2/1992 | Canada . |
| 156480 | 12/1980 | Fed. Rep. of Germany . |
| 226576 | 8/1985 | Fed. Rep. of Germany . |
| 3702495 | 6/1989 | Fed. Rep. of Germany . |
| 4215014 | 11/1992 | Fed. Rep. of Germany . |

OTHER PUBLICATIONS

Bruckner et al, *Kunststoffe*, vol. 81, 1991, pp. 751–759.

*Primary Examiner*—Maurice J. Welsh
*Attorney, Agent, or Firm*—Keil & Weinkauf

[57] ABSTRACT

A process for the preparation of recyclate polyols obtained by glycolysis of polyurethanes and/or polyurea-polyurethanes comprises metering in monofunctional and/or difunctional glycidyl ethers over the entire course of the reaction; the low-amine recyclate polyols obtained in this way are used for the preparation of cellular or noncellular polyurethanes.

8 Claims, No Drawings

PREPARATION OF RECYCLATE POLYOLS, AND THE USE THEREOF IN THE PREPARATION OF POLYURETHANES

The present invention relates to a process for the preparation of polyols from recycled materials (recyclate polyols) by glycolysis of polyurethanes (PURs) and/or polyurea-polyurethanes (PUPURs). The present invention furthermore relates to the use of the resultant recyclate polyols for the preparation of cellular or noncellular polyurethanes.

It is known that PUR and PUPUR can be converted, by reaction with compounds containing at least 2 OH groups, known as glycolysis, with degradation into liquid products which are mixtures of compounds containing OH groups. These recyclate polyols can be employed for the preparation of preferably rigid PUR foams, but also encapsulating compounds.

The process for the glycolysis of PUR and PUPUR is known in principle and has been described in various embodiments.

Reference is made here by way of example to the publications DE-A-25 16 863, DE-A-25 57 172, DE-C-37 02 495, U.S. Pat. Nos. 31,09,824 and 34,04,103. H. Brückner et al., Kunststoffe 81 (1991) 9, pp. 751–759, describe the glycolysis of PUR-RIM and compare it with other methods of recycling PUR and PUPUR.

The glycolysis methods known today differ through the glycols, catalysts and reaction conditions employed, the glycols usually being used in superstoichiometric amounts. DE-C-40 24 601 describes the use of glycols in substoichiometric amounts. The reaction product obtained here is a dispersion of partially glycolyzed PUR and PUPUR in primary polyol.

In the known glycolytic processes, the water present in the glycols and the residual moisture in the PUR and PUPUR used means that the parent amines to the isocyanates are also formed. However, aromatic amines are suspected carcinogens. To ensure safe handling of the recyclate polyols, they must be substantially removed from the latter. The amines also have an adverse effect in the PUR systems formulated from the recyclate polyols, greatly accelerating the PUR formation reaction, forming rigid urea groups and reducing the controllability of the PUR formation reaction by other catalysts. In addition, the content of free amines in the polyol components of PUR systems in contact with isocyanates immediately results in highly thixotropic compositions, as disclosed in DD-A-156 480.

DE-C-40 24 601 removes the amines by treating the glycolysis batch with monomeric acrylic acid, which reacts with the amines via the double bond and is incorporated into the recyclate polyol. This method has the disadvantage that the resultant recyclate polyols have a high acid number, which can cause difficulties in the PUR systems containing the recyclate polyol. The significant odor of acrylic acid is also undesired.

It is also possible to deaminate the recyclate polyols by reaction with propylene oxide. The disadvantage here is the necessity to use expensive pressure reactors to carry out the reaction. Since propylene oxide forms explosive mixtures with air, the plant must be explosion-proofed, which is expensive.

In addition to being required to have a low content of aromatic amines, a recyclate polyol must be a homogeneous liquid. For this reason the preferred short-chain polyol compounds are dipropylene glycol (DPG) and its higher homologs. The use of diethylene glycol (DEG) and its higher homologs, which would bring cost advantages, leads to multi-phase products, which in that form are not usable for formulating new PUR systems for producing cellular and/or noncellular PUR.

However, this phase separation can be exploited to separate the crude recyclate polyol into a fraction suitable for producing flexible foams and a fraction suitable for producing rigid foams.

This technique was described by K. W. Kroesen at the Utech'92 Conference, Mar. 31–Apr. 02, 1992, The Hague, Netherlands.

Using DEG and/or its higher homologs as glycolysis glycol would be very desirable, since these products are distinctly less costly than DPG and its homologs. The use of homogenizing agents, such as fresh polyols, does not lead to satisfactory results and, what is more, reduces the recycled content.

It is an object of the present invention to provide an inexpensive process for the glycolysis of PUR and/or PUPUR which gives a low-amine and homogeneous recyclate polyol which is suitable, in particular, for the further preparation of PUR.

We have found that this object is achieved by reacting PUR and/or PUPUR with short-chain compounds containing OH groups, glycidyl ethers being metered into the reaction mixture over the entire course of the reaction.

The present invention accordingly provides a process for the preparation of recyclate polyols by glycolysis of PUR and/or PUPUR by means of short-chain compounds containing at least 2 OH groups in the presence of catalysts, which comprises metering in monofunctional and/or difunctional glycidyl ethers over the entire course of the reaction.

Suitable monofunctional glycidyl ethers are those of the formula (I)

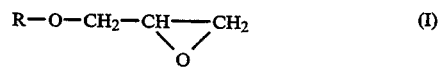

where R is phenyl, cyclohexyl, methylcyclohexyl, benzyl, i-propyl, i-butyl or a methyl- and/or ethyl-branched hydrocarbon chain having 5 to 10 carbon atoms in the linear chain and/or a group of the formula

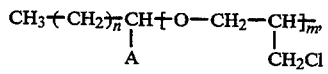

where A is an alkyl radical having 1 to 8 carbon atoms, n is from 3 to 12 and m is from 1 to 6, and suitable difunctional glycidyl ethers are those of the formula (II).

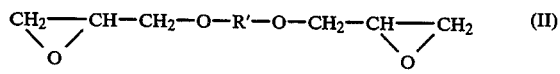

where R' is diphenylmethylene, 2,2-diphenylpropylene (bisphenol A), an unbranched hydrocarbon chain having 4 to 10 carbon atoms or a methyl- and/or ethyl-branched hydrocarbon chain having 4 to 8 carbon atoms in the linear chain.

The present invention furthermore provides the use of the low-amine recyclate polyols obtained in this way for the preparation of cellular or noncellular PUR.

The short-chain compounds containing OH groups usually contain 2 or 3 OH groups and not more than 20 carbon atoms.

Particularly suitable compounds are ethylene glycol, oligoethylene glycols, propylene glycol, oligopropylene glycols, butanediols, neopentyl glycol, diethanolamine, methyldiethanolamine and triethanolamine.

Preference is given to diethylene glycol, triethylene glycol, dipropylene glycol, tripropylene glycol and glycerol.

Known and conventional catalysts are alkali metal salts of short-chain fatty acids, titanates, stannates and antimonates.

The PUR and/or PUPUR employed is, in particular, PUR waste as produced, for example, in the dismantling of scrap automobiles (e.g. car seats, body parts and dashboards).

The PUR and/or PUPUR employed may contain mineral fibers, for example in the form of glass fibers, without affecting the novel process. The PUR may also contain synthetic textile fibers, in particular based on polyester and/or polyamide, as is the case, for example, in the recycling of automobile seats. These materials are broken down and dissolved under the novel process conditions, and therefore have no adverse effect.

The novel glycolysis process can be carried out using commercially available glycidyl ethers containing one or two epoxide groups in the molecule.

Compounds which have proven particularly suitable are monofunctional glycidyl ethers of the formula (I)

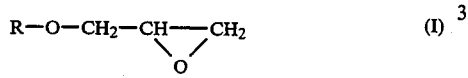

where R is phenyl, cyclohexyl, methylcyclohexyl, benzyl, i-propyl, i-butyl or a methyl- and/or ethyl-branched hydrocarbon chain having 5 to 10 carbon atoms in the linear chain and/or a group of the formula

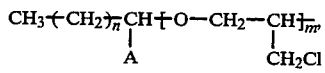

where A is an alkyl radical having 1 to 8 carbon atoms, n is from 3 to 12 and m is from 1 to 6.

Preference, in particular in the case of the use of flexible PUR foam waste for the preparation of recyclate polyols, is given to using 2-ethylhexyl glycidyl ether or a mixture of from 50 to 85% by weight of 2-ethylhexyl glycidyl ether, from 10 to 35% by weight of one or more compounds of the structure

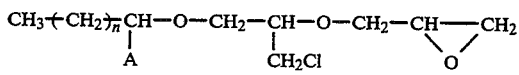

and from 5 to 20% by weight of one or more compounds of the structure

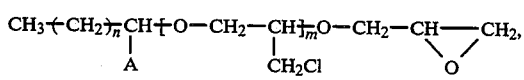

where A is an alkyl radical having 1 to 8 carbon atoms, n is from 3 to 12 and m is from 2 to 6. This glycidyl ether mixture can be prepared in a conventional manner from 2-ethylhexanol and epichlorohydrin as obtained in the synthesis of 2-ethylhexyl glycidyl ether, and can be used in the form of the technical-grade crude product, i.e. freed merely of inorganic constituents, without having to subject it to a distillation.

Other suitable compounds have proven to be the difunctional glycidyl ethers of the formula

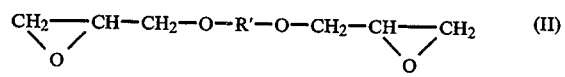

where R' is diphenylmethylene, 2,2-diphenylpropylene (bisphenol A), an unbranched hydrocarbon chain having 4 to 10 carbon atoms or a methyl- and/or ethyl-branched hydrocarbon chain having 4 to 8 carbon atoms in the linear chain.

The glycidyl ethers used can be monofunctional glycidyl ethers of the general formula (I), alone or mixed with one another, difunctional glycidyl ethers of the general formula (II), alone or mixed with one another, or mixtures of one or more mono- and difunctional glycidyl ethers.

The mixing ratio between PUR and/or PUPUR and the compounds containing OH groups is highly dependent on the chemical structure of the PUR/PUPUR employed and on the OH number of the OH-containing compounds employed, and is usually from 1:1 to 3:1, preferably 1.5 to 2.5:1, parts by weight of PUR/-PUPUR to OH-containing compounds.

The reaction temperature is usually from 180° to 250° C., preferably at from 200° to 235° C.

The reaction time is generally from 2 to 6 hours, preferably from 3 to 5 hours, depending on the crosslinking density of the PUR and/or PUPUR employed.

According to the invention, the glycidyl ethers are added to the batch comprising PUR and/or PUPUR and OH-containing compounds in an amount of, usually, from 5 to 20% by weight, based on the entire batch, over the entire reaction time, preferably at a uniform rate.

It has been found, surprisingly, that the addition of the glycidyl ethers over the entire reaction time gives recyclate polyols which contain only very small amounts of free amines.

This is surprising inasmuch as addition of the glycidyl ethers after completion of the glycolysis only results in binding of about one third of the amount of amine. A similar result is obtained if the entire amount of glycidyl ethers is added to the batch before the glycolysis is commenced.

The novel use of monofunctional and/or difunctional glycidyl ethers gives medium-viscosity recyclate polyols.

It is also surprising that the use of glycidyl ether mixtures, in particular glycidyl ether mixtures of the general formula (I), even together with DEG and/or its higher homologs, does not result in phase separation any longer and instead results in a completely homogeneous recyclate polyol of medium viscosity. Nor are weeks of storage found to give rise to phase separation.

The invention is described with reference to the examples below:

EXAMPLES 1 to 28

All the experiments were carried out using waste from PUR processors.

The waste was precomminuted in a granulator and subjected to the glycolysis without further treatment.

The glycol employed for the glycolysis was introduced into a flask fitted with a stirrer, dropping funnel, thermometer and condenser, and 0.03% by weight of dibutyltin dilaurate, based on the entire batch, was added as catalyst.

After the glycol had been heated to 200° C., the precomminuted PUR or PUPUR was added at such a rate that the flask contents remained stirrable and the temperature remained constant. When the addition was complete, the flask was sealed, the flask contents were warmed to the reaction temperature, and the glycidyl ether or the glycidyl ether mixture was metered in at a uniform rate over the entire reaction time. When the reaction was complete, the product was cooled and analyzed.

The recyclate polyol was characterized by determining the OH number (titrimetrically), the viscosity at 25° C. (rotational viscometer) and the content of free amines (high-pressure liquid chromatography (HPLC)).

The table below shows the raw materials used, the reaction conditions and results.

Examples 1, 8, 9, 13, 16, 18 and 20 are comparative examples carried out without addition of glycidyl ether.

Examples 22, 23 and 24 are likewise comparative examples in which all the glycidyl ether was added before or after the glycolysis.

Examples 25 to 28 were carried out with PUR flexible foam mixtures of low-temperature molding foam (LTMF), high-temperature molding foam (HTMF) and block foam (BF) being reacted with a glycidyl ether mixture.

The glycidyl ether mixture used was the untreated crude product from the synthesis of 2-ethylhexyl glycidyl ether from 2-ethylhexanol and epichlorohydrin, containing about 70% by weight of ethylhexyl glycidyl ether, about 20% by weight of compounds of the structure

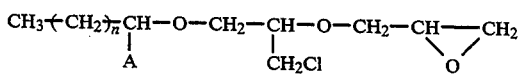

and about 10% by weight of compounds of the structure

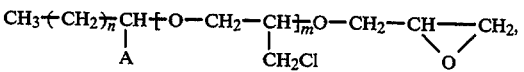

where A is ethyl, n is 4 and m is 2 or 3.

| Example No. | PUR/PUPUR type | Glycol 1) | PUR/ glycol | Glycidyl ether | Amount added % by weight 2) | Reaction Temp. °C. | time h | Amine content % by weight | Viscosity mPa·s | OH number mg of KOH/g | Comments |
|---|---|---|---|---|---|---|---|---|---|---|---|
| 1 | Flexible foam based on polyether/MDI (car seat) | DPG | 2/1 | — | 0 | 220 | 4 | 2.1 | 7524 | 342 | containing PA/PES mixed fabric |
| 2 | Flexible foam based on polyether/MDI (car seat) | DPG | 2/1 | bisphenol A diglycidyl ether | 8 | 220 | 4 | 0.2 | 19722 | 292 | containing PA/PES mixed fabric |
| 3 | Flexible foam based on polyether/MDI (car seat) | DPG | 2/1 | 1,6-hexanediol diglycidyl ether | 10 | 220 | 4 | 0.2 | 21307 | 286 | containing PA/PES mixed fabric |
| 4 | Flexible foam based on polyether/MDI (car seat) | DPG | 2/1 | i-butyl glycidyl ether | 10 | 220 | 4 | 0.2 | 9261 | 291 | containing PA/PES mixed fabric |
| 5 | Flexible foam based on polyether/MDI (car seat) | DPG | 2/1 | phenyl glycidyl ether | 12 | 220 | 4 | 0.1 | 15843 | 291 | containing PA/PES mixed fabric |
| 6 | Flexible foam based on polyether/MDI (car seat) | DPG | 2/1 | 2-ethylhexyl glycidyl ether | 10 | 220 | 4 | 0.2 | 10165 | 289 | containing PA/PES mixed fabric |
| 7 | Flexible foam based on polyether/MDI (car seat) | DPG | 2/1 | i-butyl glycidyl ether | 5 | 220 | 4 | 0.4 | 10798 | 299 | containing PA/PES mixed fabric |
| 8 | Semirigid foam based on polyether/MDI (dashboard) | DEG | 2/1 | — | 0 | 220 | 5 | 2.7 | 7161 | 461 | contaminated by release agent |
| 9 | Semirigid foam based on polyether/MDI (dashboard) | DEG | 3/1 | — | 0 | 220 | 5 | 2.6 | 32264 | 386 | contaminated by release agent |
| 10 | Semirigid foam based on polyether/MDI (dashboard) | DEG | 2/1 | phenyl glycidyl ether | 10 | 220 | 5 | 0.8 | 10840 | 424 | contaminated by release agent |
| 11 | Semirigid | DEG | 3/1 | 2-ethylhexyl | 10 | 220 | 5 | 0.7 | 11135 | 369 | contaminated by |

-continued

| Example No. | PUR/PUPUR type | Glycol 1) | PUR/ glycol | Glycidyl ether | Amount added % by weight 2) | Reaction Temp. °C. | time h | Amine content % by weight | Viscosity mPa·s | OH number mg of KOH/g | Comments |
|---|---|---|---|---|---|---|---|---|---|---|---|
| | foam based on polyether/MDI (dashboard) | | | diglycidyl ether | | | | | | | release agent |
| 12 | Semirigid foam based on polyether/MDI (dashboard) | DEG | 2/1 | 2-ethylhexyl diglycidyl ether | 20 | 220 | 5 | 0.2 | 15953 | 343 | contaminated by release agent |
| 13 | Elastomer foam based on polyether/MDI (soundproofing mat) | DEG | 2.67/1 | — | 0 | 220 | 4 | 1.1 | 6530 | 328 | contains carbon black and iron oxide black |
| 14 | Elastomer foam based on polyether/MDI (soundproofing mat) | DEG | 2.67/1 | 2-ethylhexyl diglycidyl ether | 8 | 220 | 4 | 0.1 | 4080 | 283 | contains carbon black and iron oxide black |
| 15 | Elastomer foam based on polyether/MDI (soundproofing mat) | DEG | 2.67/1 | phenyl glycidyl ether | 10 | 220 | 4 | 0.05 | 6525 | 271 | contains carbon black and iron oxide black |
| 16 | PUR-RIM based on polyether/MDI (bumper) | DEG | 2/1 | — | 0 | 220 | 4 | 1.9 | 8012 | 394 | |
| 17 | PUR-RIM based on polyether/MDI (bumper) | DEG | 2/1 | 2-ethylhexyl diglycidyl ether | 10 | 220 | 4 | 0.6 | 10292 | 344 | |
| 18 | PUPUR-RIM based on polyether/ diamine/MDI (bumper) | DEG | 2/1 | — | 0 | 220 | 4 | 3.2 | 9863 | 452 | |
| 19 | PUPUR-RIM based on polyether/ diamine/MDI (bumper) | DEG | 2/1 | 2-ethylhexyl diglycidyl ether | 15 | 220 | 4 | 0.4 | 13431 | 399 | |
| 20 | PUPUR-RIM based on polyether/ diamine/MDI (bumper) | DEG | 2/1 | — | 0 | 220 | 4 | 2.3 | 5585 | 426 | contains about 20 % of ground glass fibers |
| 21 | PUPUR-RIM based on polyether/ diamine/MDI (bumper) | DEG | 2/1 | i-butyl glycidyl ether | 12 | 220 | 4 | 0.6 | 8912 | 391 | contains about 20% of ground glass fibers |
| 22 | Flexible foam based on polyether/MDI (car seat) | DPG | 3/1 | bisphenol A diglycidyl ether | 8 | 220 | 4 | 1.2 | 16304 | 295 | addition of the glycidyl ether after the glycolysis |
| 23 | Flexible foam based on polyether/MDI (car seat) | DPG | 2/1 | phenyl glycidyl ether | 8 | 220 | 4 | 1.4 | 18903 | 286 | introduction of glycidyl ether before the glycolysis |
| 24 | Flexible foam based on polyether/MDI (car seat) | DPG | 2/1 | phenyl glycidyl ether | 12 | 220 | 4 | 1.4 | 12229 | 306 | introduction of glycidyl ether before the glycolysis |
| 25 | Flexible foam mixture 1 | DEG | 1.9:1 | mixture | 20 | 220 | 3 | 0.04 | 3312 | 352 | |
| 26 | Flexible foam mixture 2 | DEG | 1.9:1 | mixture | 20 | 220 | 3 | 0.01 | 5420 | 329 | |
| 27 | Flexible foam mixture 3 | DEG | 1.9:1 | mixture | 20 | 220 | 3 | 0 | 4982 | 303 | |
| 28 | Flexible foam | DEG | 1.9:1 | mixture | 20 | 220 | 3 | 0.006 | 3759 | 328 | |

| Example No. | PUR/PUPUR type | Glycol 1) | PUR/ glycol | Glycidyl ether | Amount added % by weight 2) | Reaction Temp. °C. | time h | Amine content % by weight | Viscosity mPa·s | OH number mg of KOH/g | Comments |
|---|---|---|---|---|---|---|---|---|---|---|---|
| | mixture 4 | | | | | | | | | | |

1) RIM = reaction injection molding
flexible foam mixture 1 = 20% by weight of LTMF, 70% by weight of HTMF, 10% by weight of BF
flexible foam mixture 2 = 43% by weight of LTMF, 36% by weight of HTMF, 21% by weight of BF
flexible foam mixture 3 = 60% by weight of LTMF, 30% by weight of HTMF, 10% by weight of BF
flexible foam mixture 4 = 70% by weight of LTMF, 25% by weight of HTMF, 5% by weight of BF
2) DEG = diethylene glycol
DPG = dipropylene glycol
3) based on the entire batch of PUR/HPUR + glycol The recyclate polyols obtained according to Examples 25 to 28 were investigated in respect of their suitability for producing PUR.

EXAMPLE 29

Coating 38.6 parts by weight of recyclate polyol from Example 25 were mixed with 20.0 parts by weight of a linear polyether alcohol having an OH number of 56 mg of KOH/g (e.g. Lupranol 1000 from BASF AG), 28.4 parts by weight of an alkyl p-toluenesulfonate (e.g. Mesamoll from Leuna-Werke AG), 6.0 parts by weight of a drier, e.g. zeolite, 0.4 part by weight of dibutyltin dilaurate, 5.0 parts by weight of amine activator Z 50 (Dabco) and 2.0 parts by weight of color paste/black.

Reaction with polymeric diphenylmethane diisocyanate (e.g. Lupranat M 20S from BASF AG) in a mixing ratio of polyol component: isocyanate component of 100:35 parts by weight produced an elastic coating having the following properties:

| | | |
|---|---|---|
| Density | 1.068 | g/cm³ |
| Abrasion | 704 | mm³ |
| Tensile strength | 8.7 | N/mm² |
| Breaking extension | 53% | |
| Tear propagation resistance (GRAVES) | 289 | N/cm |
| Hardness Shore A | 85. | |

EXAMPLE 30

Rigid Foam 81.0 parts by weight of recyclate polyol from Example 27 were mixed with 10.0 parts by weight of a rigid foam polyetherol of OH number 440 mg of KOH/g, functionality of 4.65, initiated with a mixture of sucrose and glycerol (e.g. Lupranol VP 9201 from BASF AG), 3.0 parts by weight of glycerol, 0.3 part by weight of tetramethylhexamethylenediamine, 0.3 part by weight of dimethylcyclohexylamine, 1.9 parts by weight of silicone stabilizer and 2.5 parts by weight of water.

Reaction of the mixture with polymeric diphenylmethane diisocyanate (e.g. Lupranat M 20S from BASF AG) in a mixing ratio of polyol component: isocyanate component of 100:128 produced a fine-celled rigid foam having the following properties:

| | | |
|---|---|---|
| Crude Density | 49 | kg/m³ |
| Compressive strength (in foaming direction) | 0.41 | N/mm² |
| Compressive strength (transversely to foaming direction) | 0.20 | N/mm² |
| Open cells | 11.7% | |
| Water uptake | 3.2% | |
| Dimensional stability at −30° C. | <1% | |
| Dimensional stability at 80° C. | <1%. | |

We claim:

1. A process for the preparation of recyclate polyols having a low amine content by reacting polyurethanes and/or polyurea-polyurethanes with short-chain compounds containing at least 2 OH groups in the presence of catalysts, which comprises metering in monofunctional and/or difunctional glycidyl ethers over the entire course of the reaction.

2. A process as claimed in claim 1, wherein the monofunctional glycidyl ethers used are those of the formula (I)

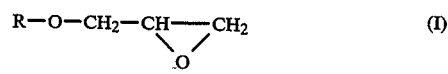

where R is phenyl, cyclohexyl, methylcyclohexyl, benzyl, i-propyl, i-butyl or a methyl- and/or ethyl-branched hydrocarbon chain having 5 to 10 carbon atoms in the linear chain and/or a group of the formula

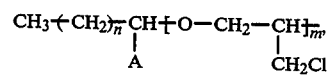

where A is an alkyl radical having 1 to 8 carbon atoms, n is from 3 to 12 and m is from 1 to 6.

3. A process as claimed in claim 1, wherein the difunctional glycidyl ethers used are those of the formula (II)

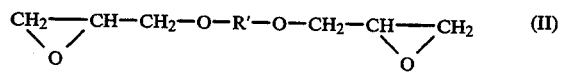

where R' is diphenylmethylene, 2,2-diphenylpropylene, an unbranched hydrocarbon chain having 4 to 10 carbon atoms or a methyl- and/or ethyl-branched hydrocarbon chain having 4 to 8 carbon atoms in the linear chain.

4. A process as claimed in claim 1, wherein the glycidyl ethers used are monofunctional glycidyl ethers of the general formula (I), alone or mixed with one another, difunctional glycidyl ethers of the general formula (II), alone or mixed with one another, or mixtures of one or more mono- and difunctional glycidyl ethers.

5. A process as claimed in claim 1, wherein the monofunctional and/or difunctional glycidyl ethers are added in an amount of from 5 to 20% by weight, based on the entire reaction mixture.

6. A process as claimed in claim 1, wherein the reaction temperature is held at from 180° to 250° C., preferably at from 200° to 235° C.

7. A process as claimed in claim 1, wherein the reaction time is from 2 to 6 hours, preferably from 3 to 5 hours.

8. A process as claimed in claim 1, wherein the glycidyl ethers are metered in at a uniform rate over the entire reaction time.

* * * * *